US009143181B1

(12) United States Patent
Jia et al.

(10) Patent No.: US 9,143,181 B1
(45) Date of Patent: Sep. 22, 2015

(54) VERGE HYBRID CELL PHONE PROTECTOR CASE

(71) Applicants: Jun Jia, Guangdong (CN); Lihui Zhang, Guangdong (CN)

(72) Inventors: Jun Jia, Guangdong (CN); Lihui Zhang, Guangdong (CN)

(73) Assignee: Valor Communication, Inc., City of Industry, CA (US)

( * ) Notice: Subject to any disclaimer, the term of this patent is extended or adjusted under 35 U.S.C. 154(b) by 0 days.

(21) Appl. No.: 14/298,833

(22) Filed: Jun. 6, 2014

(51) Int. Cl.
*H04M 1/00* (2006.01)
*H04B 1/3888* (2015.01)
*G06F 1/16* (2006.01)

(52) U.S. Cl.
CPC ............ *H04B 1/3888* (2013.01); *G06F 1/1616* (2013.01); *G06F 1/1626* (2013.01)

(58) Field of Classification Search
CPC . H04B 1/3888; H04M 1/0214; G05F 1/1626; G06F 1/1616
USPC ............. 455/575.7, 575.1, 556.2; 361/679.01
See application file for complete search history.

(56) References Cited

U.S. PATENT DOCUMENTS

| | | | |
|---|---|---|---|
| 5,845,803 A | 12/1998 | Saito et al. | |
| 7,697,269 B2 | 4/2010 | Yang et al. | |
| 7,886,903 B1 * | 2/2011 | Wurzelbacher et al. | 206/320 |
| 8,148,633 B2 | 4/2012 | Hung | |
| 8,245,842 B2 | 8/2012 | Bau | |
| 8,393,466 B2 | 3/2013 | Rayner | |
| 8,439,191 B1 | 5/2013 | Lu | |
| 8,462,517 B2 | 6/2013 | Wojack et al. | |
| 8,675,862 B1 * | 3/2014 | Lin | 379/451 |
| 2006/0166711 A1 * | 7/2006 | Schworm | 455/575.1 |
| 2009/0005132 A1 * | 1/2009 | Ogatsu | 455/575.3 |
| 2009/0291718 A1 * | 11/2009 | Fukazawa | 455/575.1 |
| 2010/0200456 A1 * | 8/2010 | Parkinson | 206/701 |
| 2011/0157866 A1 * | 6/2011 | Li et al. | 362/84 |
| 2012/0037524 A1 | 2/2012 | Lonsdale, II et al. | |
| 2013/0113348 A1 * | 5/2013 | Holben et al. | 312/223.1 |
| 2013/0273944 A1 | 10/2013 | Wilson et al. | |
| 2013/0292288 A1 | 11/2013 | Wiles | |
| 2014/0083876 A1 * | 3/2014 | Lin | 206/37 |
| 2014/0262848 A1 * | 9/2014 | Fathollahi et al. | 206/37 |
| 2014/0268516 A1 * | 9/2014 | Fathollahi et al. | 361/679.01 |
| 2015/0065208 A1 * | 3/2015 | Balaji et al. | 455/575.8 |

FOREIGN PATENT DOCUMENTS

CN      202980633 U      6/2013

* cited by examiner

*Primary Examiner* — Danh Le
(74) *Attorney, Agent, or Firm* — Thomas I. Rozsa

(57) ABSTRACT

A cell phone protector case having a soft silicone interior to retain the cell phone in a safe and operative manner. A key unique feature of the present invention cell phone protector case is to connect the inside soft silicone interior and the outside hard plastic protective shell through an innovative mechanism wherein the soft silicon interior has slot openings and the front and back exterior hard plastic shell members have retaining member clips that are inserted into and retained within the receiving openings within the soft silicone interior so that the soft silicone interior has an all around protection on the inside and absorbs shocks while the exterior front and back hard plastic members protect the front and back of the cell phone or any other portable electronic device retained within the protective case.

7 Claims, 8 Drawing Sheets

FIG 3
FIG 4

VERGE HYBRID CELL PHONE PROTECTOR CASE

BACKGROUND OF THE INVENTION

1. Field of the Invention

The present invention relates to the field of cell phone protector cases which are designed to enable the cell phone to be used while at the same time providing a protective covering over the cell phone to protect the cell phone while the cell phone is being used and provide a layer of protection to prevent the cell phone from being damaged if it is dropped or bumped against a hard object.

2. Description of the Prior Art

The following 11 patents and published patent applications are the closest prior art known to the inventor.

1. U.S. Pat. No. 5,845,803 issued to Koji Saito et al. on Dec. 8, 1998 for "Waterproof Casing Structure for Electronic Equipment" (hereafter the "Saito Patent");

2. U.S. Pat. No. 7,697,269 issued to Qing Yang et al. on Apr. 13, 2010 for "Housing Mechanism for Electronic Device" (hereafter the "Yang Patent");

3. United. States Published Patent Application No. 2012/0037524 to Thomas J. Lonsdale, II et al. on Feb. 16, 2012 for "Protective Case with. Substantially Rigid Outer Layer and Cushioning Inner Layer" (hereafter the "Lonsdale Published Patent Application");

4. U.S. Pat. No. 8,148,633 issued to Kuang-Hui Hung on Apr. 3, 2012 for "Housing for an Electronic Apparatus" (hereafter the "Hung Patent");

5. U.S. Pat. No. 8,245,842 issued to Steven Chi Vun Bau on Aug. 21, 2012 for "Protective Case Having a Hybrid Structure for Portable Handheld Electronic Devices" (hereafter the "Bau Patent");

6. U.S. Pat. No. 8,393,466 issued to Gary Rayner on Mar. 12, 2013 for "Housing for Encasing an Object" (hereafter the "Rayner Patent");

7. U.S. Pat. No. 8,439,191 issued to Min Lu on May 14, 2013 for "Cell Phone Protector Case Having the Combination of an Interior Soft Silicone Shell and a Hard Exterior Shell with Aligned Retaining Members" (hereafter the "Lu Patent");

8. U.S. Pat. No. 8,462,517 issued to Jason P. Wojack et al. on Jun. 11, 2013 for "Reworkable Mobile Electronic Device" (hereafter the "Wojack Patent");

9. United States Published Patent Application No. 2013/0273944 to Scott Harold Wilson et al. on Oct. 17, 2013 for "Portable Electronic Device Case" (hereafter the "Wilson Published Patent Application");

10. United States Published. Patent Application No. 2013/0292288 to W. Paul Willes on Nov. 7, 2013 for "Impact Protection Enclosure For a Mobile Electronic Device" (hereafter the "Willes Published Patent Application").

11. Chinese Patent No. CN202980633U issued to Shan Lu on Jun. 12, 2013 for "Multifunctional Waterproof Mobile Phone Protection Case" (hereafter the "Lu. Chinese Patent").

The Saito Patent has a structure of having the attaching mechanisms as shown in FIGS. 8 and 9 which is different from the present invention.

The Yang Patent discloses having the concept of having prongs 242 as shown in FIG. 1. However, the configuration is completely different from the present invention. The relevant portions of the patent are found in Column 2, Lines 11 through 35.

The Lonsdale Published Patent Application discloses a protective case with a substantially-rigid outer layer and cushioning inner layer. The configuration is different from the present invention.

The Hung Patent discloses a housing for an electronic apparatus which is different from the present invention.

The Bau Patent discloses a cell phone protector with a rib cage design which is different from the present invention.

The Rayner Patent is very long. Referring to Column 33 Lines 45 through 54 the patent text states:

"FIG. 4G provides another similar embodiment to that of FIG. 4E. In this embodiment, both the top member 2 and the bottom member 3 include undulating clasping mechanism 27 and 37 having either male or female locking elements, and the perimeter member 4 also includes corresponding female and/or male locking elements 4a and 4b, such that as the top 2 and bottom 3 members are coupled, e.g., snapped, together the male and female locking elements are joined thereby sealing the housing 1 around the device 100 in a watertight seal."

The Lu Patent is assigned to the same entity which is the assignee of this application. The same attorney wrote the Lu patent application which issued as the Lu Patent and also wrote the present application. The inventions are different.

The Wojack Patent discloses a different type of cell phone protector case.

The Wilson Published Patent Application discloses an impact protection enclosure for a mobile electronic device which is configured differently from the present invention.

The Willes Published Patent Application discloses an impact protection enclosure for a mobile electronic device which is configured differently from the present invention.

The Lu Chinese Patent discloses a multifunctional waterproof mobile phone protection case. The bottom envelops the outside of the foam interior and is different from the present invention.

SUMMARY OF THE INVENTION

The present invention is a cell phone protector case having a soft silicone interior member to retain the cell phone in a safe and operative manner. A key unique feature of the present invention cell phone protector case is to connect the inside soft silicone interior member to the outside hard plastic protective shells through an innovative mechanism wherein the soft silicon interior member has slot openings and the front and back exterior hard plastic shell members have retaining member fasteners or clips formed as part of each respective inner and outer protective shell, that are inserted into and retained within the receiving slot openings within the soft silicone interior member so that the soft silicone interior member has an all around protection on the inside and absorbs shocks while the exterior front and back hard plastic members protect the front and back of the cell phone or any other portable electronic device retained within the protective case.

It is an object of the present invention to provide a cell phone protector case having a soft interior member to retain a cell phone with the cell phone screen and keypad visible and touchable, with a front hard protector shell retained onto a front surface of the soft interior member and a back hard protector shell retained onto a rear surface of the soft interior member, without having any portion of the fastening members of the front hard shell which retain it to the front of the soft interior member extending onto an end wall of the protector case and without having any portion of the fastening members of the back hard shell which retain it to the rear of the soft interior member extending onto an end wall of the protector case.

It is a further object of the present invention to have mating slot openings in the front surface of the soft interior member to receive and retain aligned fastening members from the front hard protector shell and mating slot openings in the rear surface of the soft interior member to receive and retain aligned fastening members from the back hard protector shell.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a left side elevational view of the present invention cell phone protector case when viewed from the front of the cell phone protector case;

FIG. 4 is a right side elevational view of the present invention cell phone protector case when viewed from the front of the cell phone protector case;

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
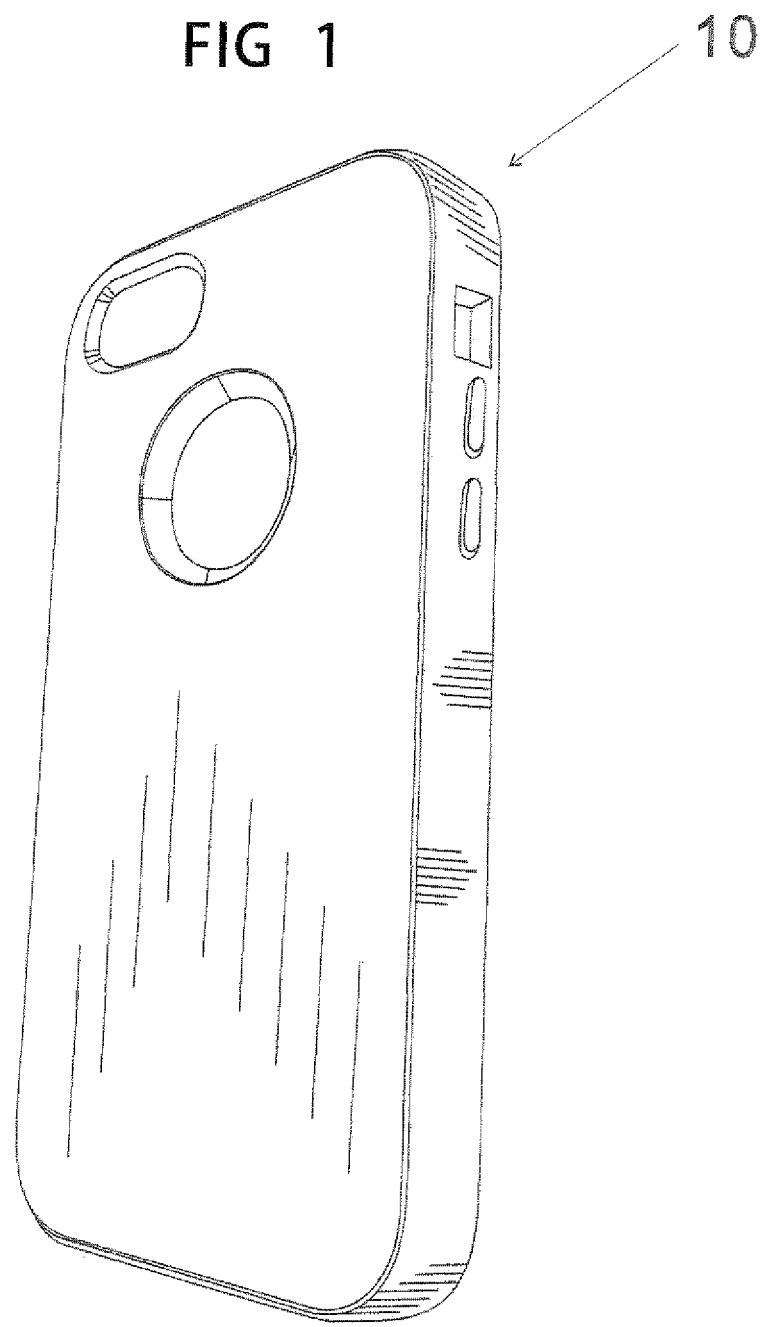
FIG. 1 is a right rear perspective view of the present invention cell phone protector case.
Figure 2:
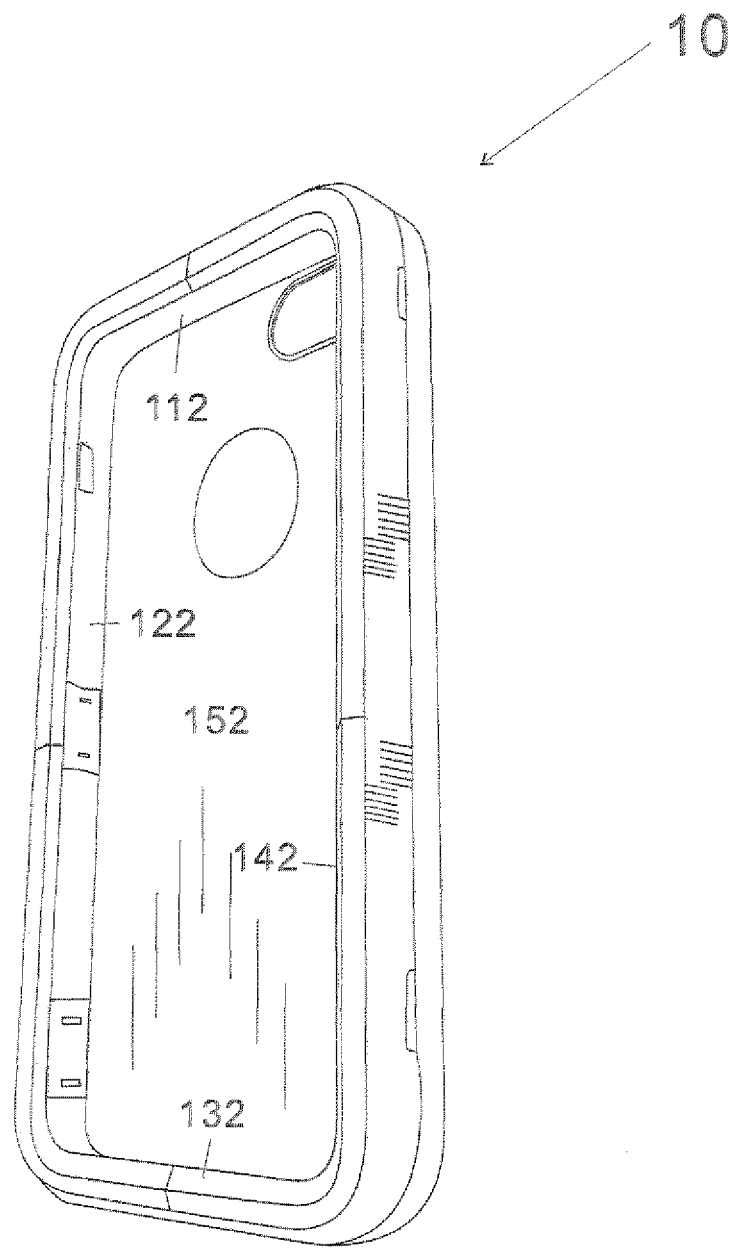
FIG. 2 is a left front perspective view of the present invention cell phone protector case.
Figure 5:
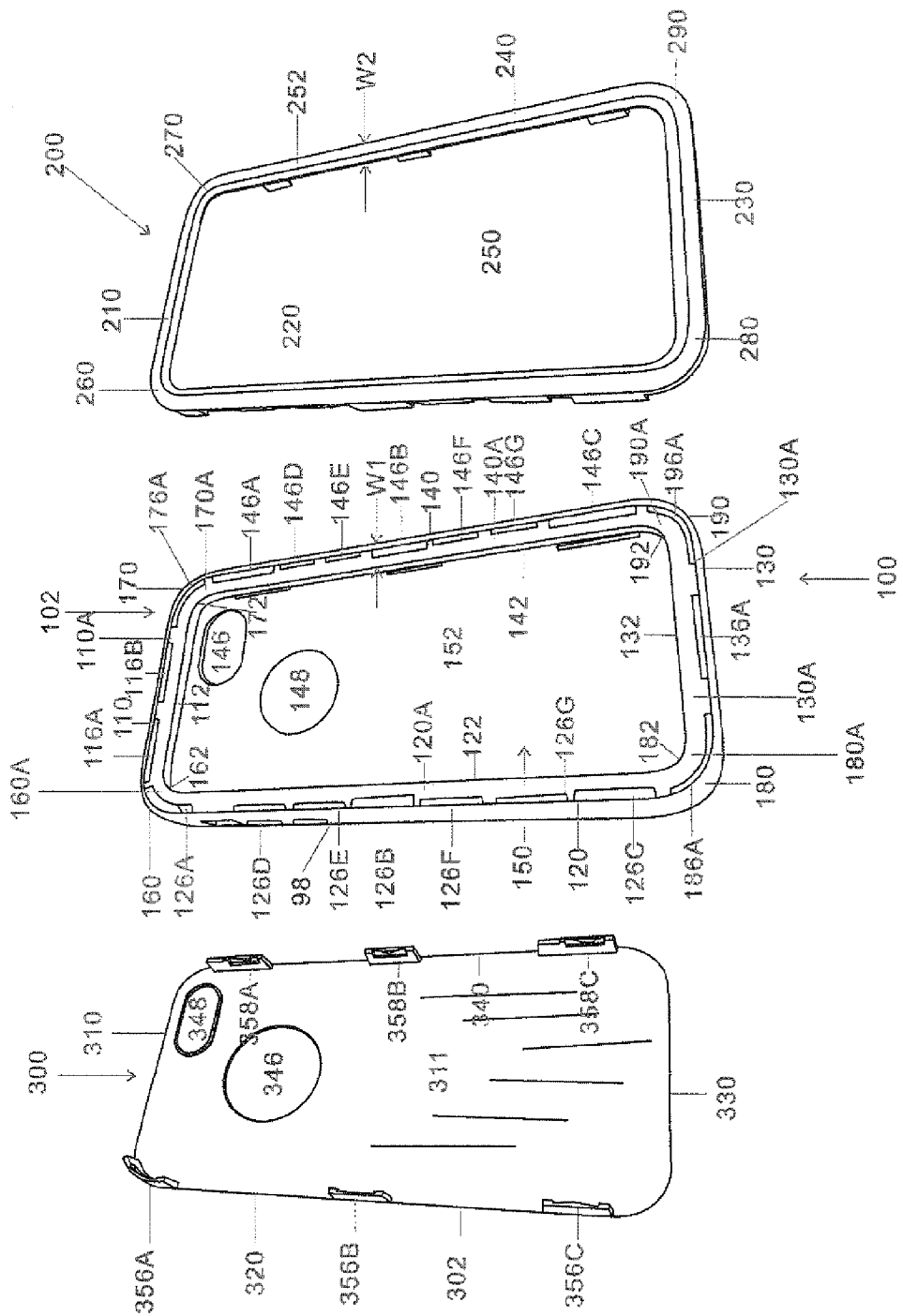
FIG. 5 is an exploded front perspective view of the present invention illustrating from left to right the rear hard shell protective member, the soft silicone interior member, and the front hard shell protective member.
Figure 6:
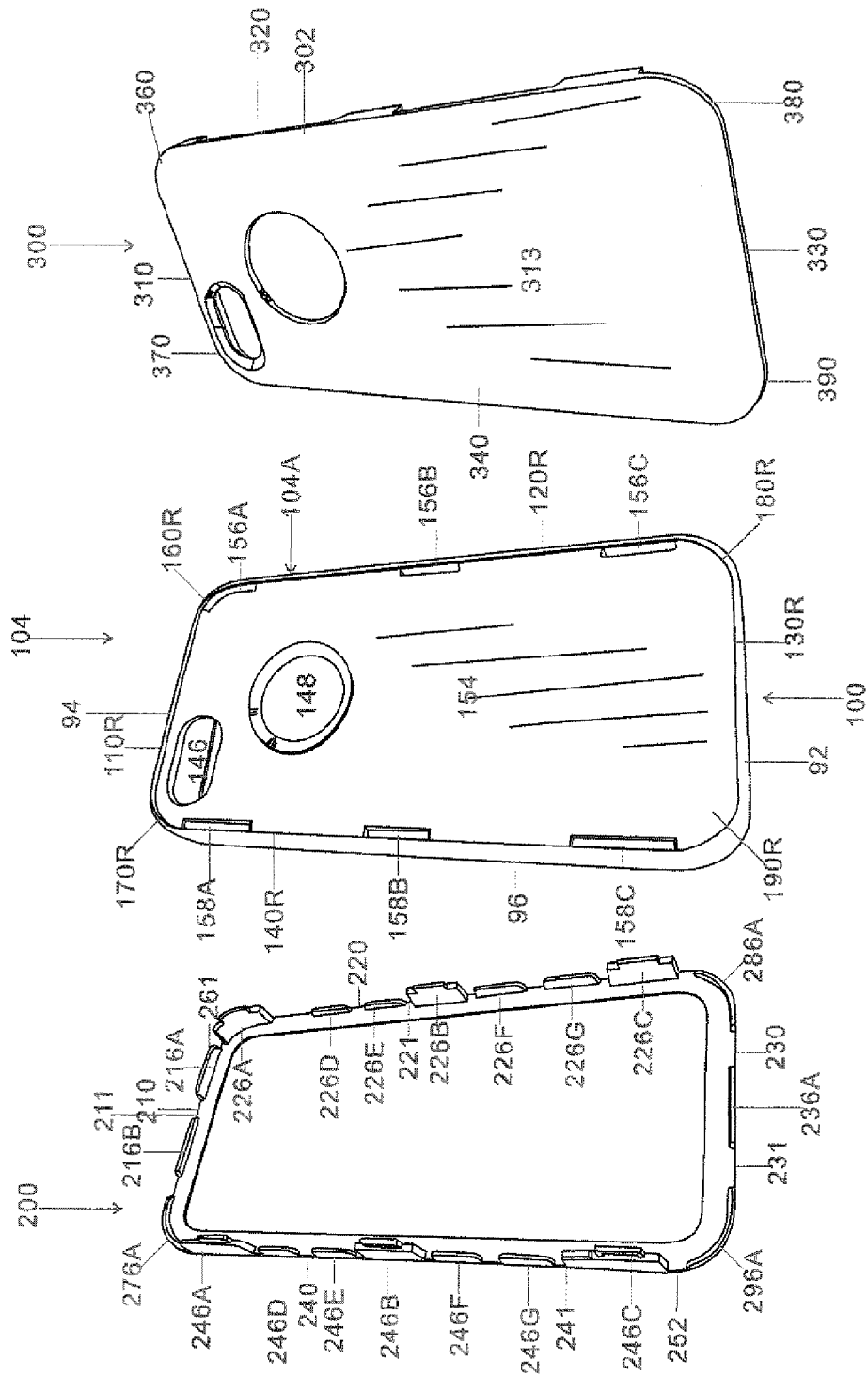
FIG. 6 is an exploded rear perspective view of the present invention illustrating from left to right the front hard shell protective member, the soft silicone interior member, and the rear hard shell protective member.
Figure 7:
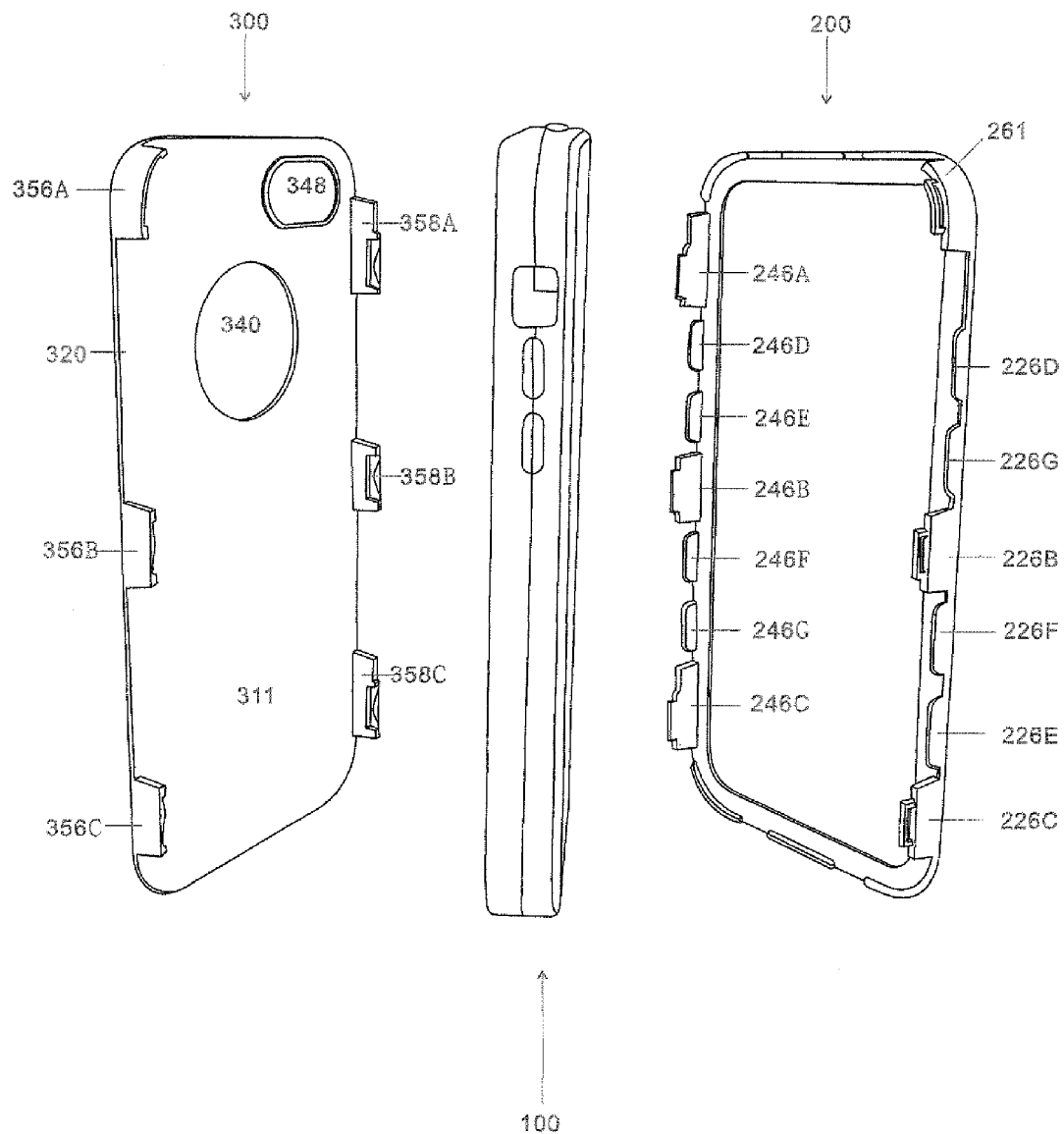
FIG. 7 is an exploded left side elevational view of the present invention illustrating from left to right the rear hard shell protective member, the soft silicone interior member, and the front hard shell protective member.
Figure 8:
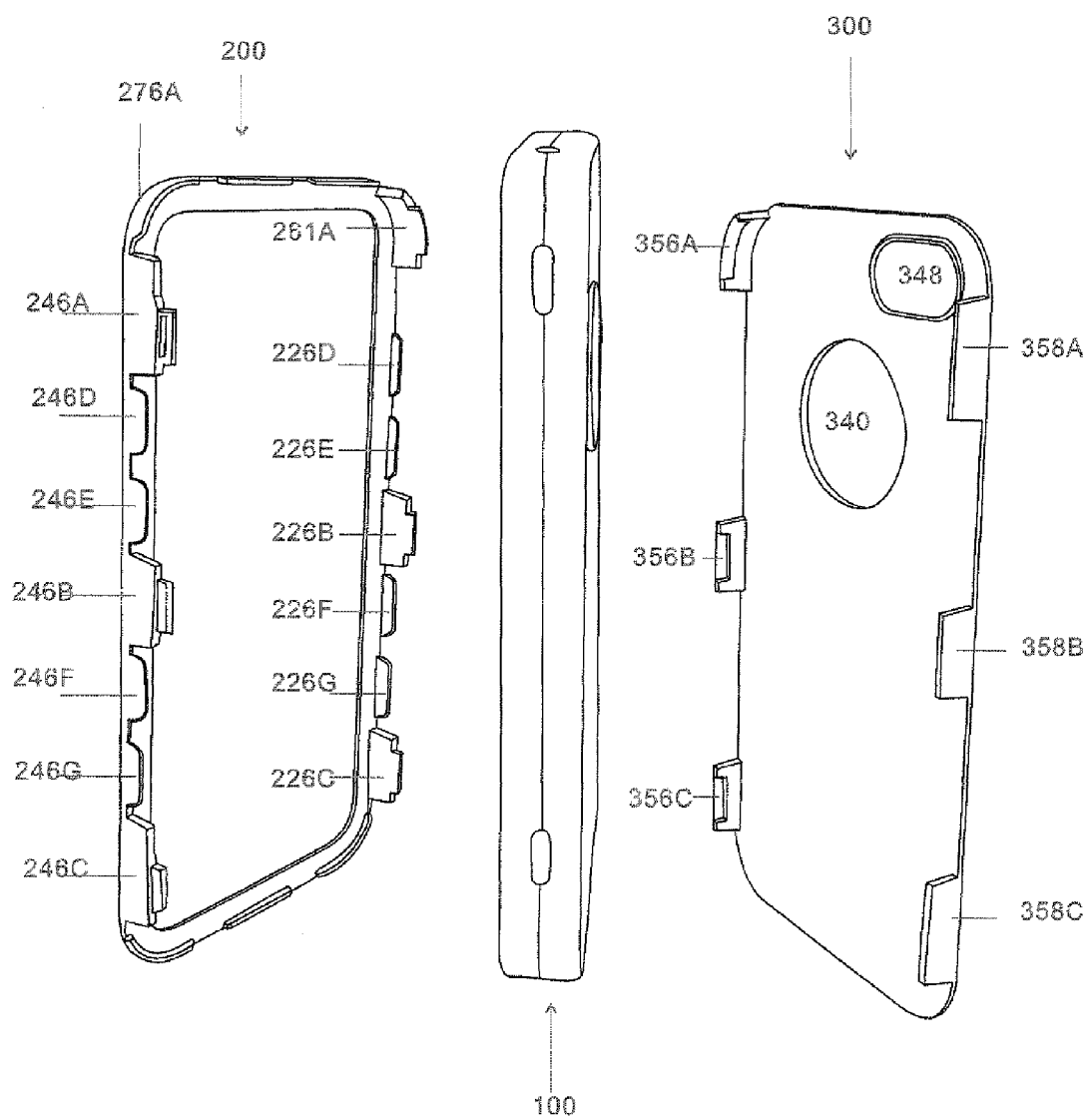
FIG. 8 is an exploded right side elevational view of the present invention illustrating from left to right the front hard shell protective member, the soft silicone interior, and the rear hard shell protective member.

Referring to FIGS. 1 and 2, the present invention cell phone protector case 10 is illustrated in its assembled condition without the cell phone contained therein. The cell phone protector case 10 comprises the combination of three primary components: (1) an interior soft member 100 made out of material selected from the group consisting of silicone and soft rubber, (2) a front hard exterior shell 200 made out of material selected from the group consisting of hard plastic and metal and (3) a rear hard exterior shell 300 made out of material selected from the group consisting of hard plastic and metal. The front hard exterior shell 200 is open so that a user has access to the front keypad, front operating buttons and screen or touch screen. The interior opening and sidewalls of the interior soft shell 100 is designed to conform the shape of the model cell phone and retain the model cell phone in a partially press fit manner.

The interior soft silicone member 100 or also referred to as an interior soft member 100 (see FIGS. 5, 6, 7 and 8) is designed to securely and firmly grip the cell phone 500 (see FIG. 9) to be sure that it is securely retained within the cell hone protector case 10. Referring to FIGS. 5, 6, 7 and 8, the key features of the interior silicone member 100 includes the following:

A continuous boundary for a front surface 102 includes an upper transverse section 110 with a front surface 110A and interior surface 112, a first transverse sidewall 120 with a front surface 120A and interior surface 122, a lower transverse section 130 with a front surface 130A and interior surface 132 and a second transverse sidewall 140 with a front surface 140A and interior surface 142. The upper transverse section 110 and the lower transverse section 130 are parallel and the first sidewall 120 and the second sidewall 140 are parallel. The upper transverse section 110 and the first sidewall 120 flow together at a first corner 160 with a front surface 160A and interior surface 162. The upper transverse section 110 and the second sidewall 140 flow together at a second corner 170 with a front surface 170A and interior surface 172. Similarly, the lower transverse section 130 and the first sidewall 120 flow together at a third corner 180 with a front surface 180A and interior surface 182. The lower transverse section 130 and the second sidewall 140 flow together at a fourth corner 190 with a front surface 190A and interior surface 192. The upper transverse section 110, the first sidewall 120 and front surface 120A, the lower transverse section 130 and front surface 130A and second sidewall 140 and front surface 140A all have the same width "W1". An integrally molded back plate 150 having a front interior surface 152 and a rear exterior surface 154 which respectively match the interior surfaces 112, 162, 122, 182, 132, 192, 142 and 172 of the respective upper rim 110, first corner 160, first transverse sidewall 120, third corner 180, lower rim 130, fourth corner 190, second transverse sidewall 140, and second corner 170 completes the framework of the interior silicone membrane or shell 100.

The rear surface 104 has a continuous boundary 104A which includes an upper transverse section 110R, a first sidewall 120R, a lower transverse section 130R and a second sidewall 140R. The upper transverse section 100R and the lower transverse section 130R are parallel, and the first sidewall 120S and second sidewall 140R are parallel. The upper transverse section 110R and the first sidewall 120R flow together at a first corner 160R. The upper transverse section 110R and the second sidewall 140 flow together at second corner 170R. Similarly, the lower transverse section 130R and the first section 120R flow together at a third corner 180R. The lower transverse section 130R and the second sidewall 1408 flow together at a fourth corner 190R. The rear surface sections are aligned with the front surface sections and the boundary of the integrally molded back plate is respectively adjacent a rear section or sidewall.

A key innovation of the present invention cell phone protector case 10 is that the respective front surfaces 110A, 120A, 130A and 140A of the upper transverse section 110, first sidewall 120, lower transverse section 130 and second sidewall 140 each have at least one slot openings. By way of example only, upper transverse section front surface 110A has two spaced apart slot openings 116A and 116B; lower transverse section front surface 130A has one slot opening 136A; first corner upper surface 160A has an arcuate slot opening 126A and first sidewall upper surface 120A has two large spaced apart slot openings 126B, and 126, and four small spaced apart slot openings 126D, 126E, 126F and 126G with slot openings 126D and 126E between arcuate slot openings 126A and slot opening 126B and slot openings 126F and 126G between slot openings 126B and 126C; and second sidewall upper surface 144 has three large spaced apart slot openings 146A, 146B and 146C and four small spaced apart slot openings 146D, 146E, 146F and 146G with slot openings slot openings 146F and 146G between slot openings 146B and 146C. The upper surface 160A of corner 160 has the arcuate slot opening 126A. The other corners have smaller slot openings. The upper surface 174 of corner 170 has an arcuate slot opening 176A. The upper surface 184 of corner 180 has an arcuate slot opening 186A. The upper surface 194 of corner 190 has an arcuate slot opening 196A.

In addition, the rear surface exterior surface 154 of integrally molded backplate 150 has a multiplicity of slot openings. By way of example, the exterior surface 154 adjacent to the rear second sidewall 140R has three spaced apart slot openings 158A, 158B and 1580 and the rear exterior surface 154 adjacent to first corner 160R has an arcuate opening 156A and the rear corner 160R and adjacent first rear sidewall 120R has two spaced apart slot openings, slot openings 156B and 156C adjacent to first rear sidewall 120R.

The interior silicone member 100 has a first end wall 98 and a second end wall 96, a top wall 94 and a bottom wall 92 which extend between the front surface 102 and the rear surface 104 of the interior silicone member 100. A key innovation of the present invention cell phone protector case 10 is that the front hard shell 200 and rear hard shell 300 are retained onto front surface 102 and rear surface 104 without extending to the first end wall 98 and the second end wall 96, the top wall 94 and the bottom wall 92.

The integrally molded backplate has openings such as 148 and 146 to accommodate operating components of a specific model of cell phone.

The second key innovation of the present invention cell phone protector case 10 is the front hard exterior shell 200 which has a continuous boundary 252 including an upper transverse section 210, a first sidewall 220, a lower transverse section 230 and a second sidewall 240. The upper transverse section 210 and the lower transverse section 230 are parallel and the first sidewall 220 and second sidewall 240 are parallel. The upper transverse section 210 and the first sidewall 220 flow together at a first corner 260. The upper transverse section 210 and the second sidewall 240 flow together at a second corner 270. Similarly, the lower transverse section 230 and the first sidewall 220 flow together at a third corner 280. The lower transverse section 230 and second sidewall 240 flow together at a fourth corner 290. The upper transverse section 210, the first sidewall 220, the lower transverse section 230, the second sidewall 240, and corners 260, 270, 280 and 290 all have the same width W2" which is wider than width "W1" and surround an interior opening 250. The front exterior hard shell 200 has a continuous exterior circumference 252 with mating fasteners such as clip extending from the exterior circumference of each section and aligned with the slot openings on the front surfaces of the interior soft silicone shell 100. By way of example, the exterior edge 211 of upper transverse section 210 has mating fasteners 216A and 216B respectively aligned with and received in slot openings 116A and 116B; the exterior edge 231 of lower transverse section 230 has a mating fastener 236A aligned with and received in slot opening 136A; the exterior edge 261 of first corner 260 has an arcuate mating fastener 226A and the exterior edge 221 of first sidewall 220 has mating fasteners 226B, 226C, 226D, 226E, 226F and 226G respectively aligned with and received in arcuate slot opening 126A, and slot openings 126B, 126C, 126D, 126E, 126F, 126G; and exterior edge 241 of second sidewall 240 respectively has fasteners 246A, 246B, 246C, 246D, 246E, 246F and 246G respectively aligned with and received in slot openings 146A, 146B, 146C, 146D, 146E, 146F and 146G. In addition to the larger arcuate fastener 226A at corner 160; smaller arcuate faster 276A at corner 270 is inserted into small arcuate corner slot 176A. Smaller arcuate fastener 286A at corner 180 is inserted into small arcuate corner slot 186A. Smaller arcuate fastener 296A at corner 190 is inserted into small arcuate corner slot 196A. Therefore, the front hard exterior shell 200 is retained within the front surface of the soft silicone interior shell 100 without extending to any edge of the soft silicone interior shell 100, and the front hard exterior shell width W2 extends over a portion of the front surface 152 of molded back plate 150 to help retain a cell phone 500 within the soft silicone interior 100.

The third key component of the present invention cell phone protector case 10 is the back hard shell 300 having a multiplicity of fasteners such as clips extending from an interior surface 311 of the back hard shell 300 to be aligned with and received in slot openings in the rear surface 154 of backing plate 150 of the soft silicone interior 100 so that the fasteners do not extend onto a sidewall 98 and 96 or top wall 94 or bottom wall 92 of the soft silicone interior shell 100 when the back hard shell 300 is retained onto the rear surface 154.

The back hard shell 300 has a continuous boundary 302 including an upper transverse section 310, a first sidewall 320, a lower transverse section 330 and a second sidewall 340. The upper transverse section 310 and lower transverse section 330 are parallel and the first sidewall 320 and second sidewall 340 are parallel. The upper transverse section 310 and first sidewall 320 flow together at a first corner 360. The upper transverse section 320 and the second sidewall 340 flow together at a second corner 370. Similarly, the lower transverse section 330 and the first sidewall 320 flow together at a third corner 380. The lower transverse section 330 and the second sidewall 340 flow together at a fourth corner 390. The back hard shell 300 has a rear wall 313 and an interior wall 311 which have openings 348 and 346 which correspond to the openings in the backing plate 150 to accommodate functions of a specific model cell phone 500 retained in the cell phone protector case 10.

Referring to FIGS. 5 through 8, an arcuate fastener 356A extends from the interior surface 311 adjacent corner 360 and spaced apart fasteners 356B and 356C fasteners extend from rear surface 311 adjacent first sidewall 320 of hard plastic shell 300 and are respectively aligned with and retained in arcuate slot opening 156A and slot openings 156B and 156C. Spaced apart fasteners 358A, 3588 and 358C extend from the interior surface 311 adjacent second sidewall 340 and are respectively aligned with and received in slot openings 158A, 158B and 158C. In this way, rear hard shell 300 is retained onto the rear surface 154 of integrally molded backing plate 150 without extending to side walls 96 and 98 and not extending to top wall 94 and bottom wall 92 of the soft silicone interior member 100.

Figure 9:
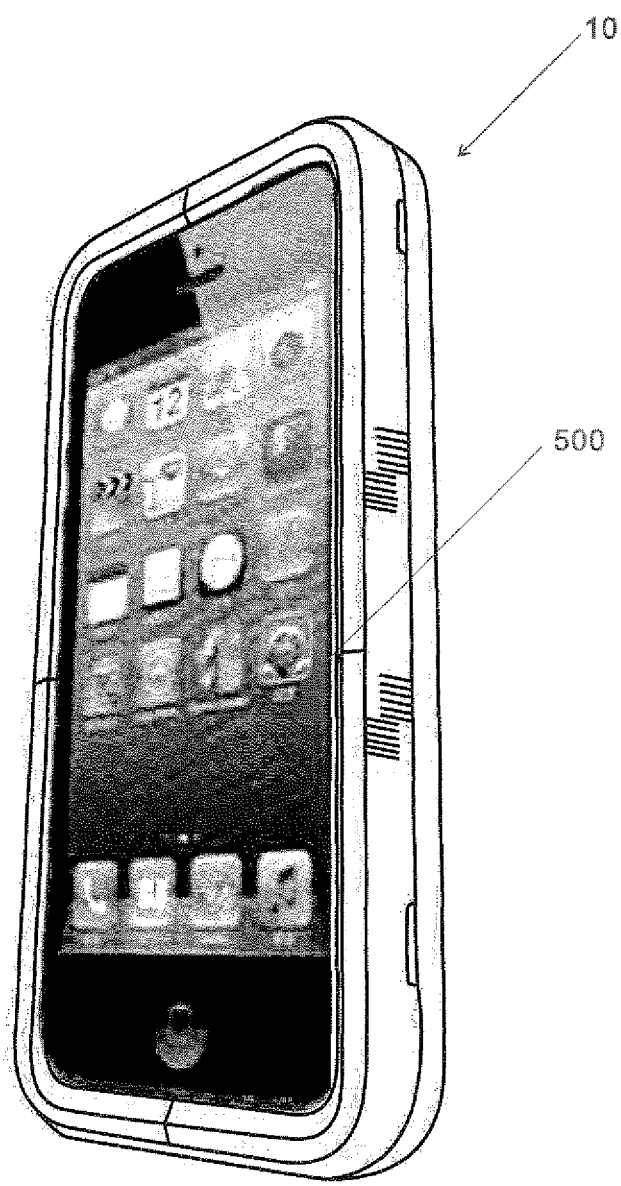
FIG. 9 is a front perspective view of the cell phone protector case retaining a cell phone with the screen visible and retained by the interior silicone member and a portion of the front hard protector plate.

FIG. 9 illustrates a cell phone 500 retained in the silicone interior 100 and partially retained by the front hard plastic shell 200.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A cell phone protector case, comprising:
  a. an interior soft shell made out of material selected from the group consisting of silicone and soft rubber, a front hard exterior shell made out of material selected from the group consisting of hard plastic and metal and a rear hard exterior shell made out of material selected from the group consisting of hard plastic and material, the front hard exterior shell is open so that a user has access to the front keypad, front operating buttons and screen or touch screen of a cell phone retained within the interior soft shell, the interior soft shell is designed to conform the shape of the a specific model of cell phone retained in the soft interior shell by a press fit and partially retained by the front hard exterior shell;
  b. the interior soft shell includes the following:
    b.1 a continuous boundary for a front surface having an upper transverse section, a first sidewall, a lower transverse section and a second sidewall, the upper transverse section and the lower transverse section are parallel and the first sidewall and the second sidewall are parallel, the upper transverse section and the first sidewall flow together at a first corner, the upper transverse section and the second sidewall flow together at a second corner, the lower transverse section and the first sidewall flow together at a third corner, the lower transverse section and the second sidewall flow together at a fourth corner, the upper transverse section, the first sidewall, the lower transverse section and second sidewall all have the same first width, and a continuous boundary on its rear surface which has upper and lower sections, first and second sidewalls and corners which are aligned with respective upper transverse section, lower transverse section, first sidewall, second sidewall, and corners of the front surface and respectively separated by a top wall, a bottom wall, a first sidewall and a second sidewall of the soft interior shell body;
    b.2 an integrally molded back plate having a front interior surface and a rear exterior surface which respectively match each interior surface of the respective upper transverse section, first corner, first sidewall, third corner, lower transverse section, the fourth corner, the second sidewall, and second corner completes a framework of the interior soft shell,
    b.3 the respective front surfaces of the upper transverse section, first sidewall, lower transverse section and second sidewall each have at least one slot opening as follows: the upper section front surface has two spaced apart slot openings, lower transverse section front surface has one slot opening; first corner upper surface has an arcuate slot opening and first sidewall upper surface has two large spaced apart slot openings, and four small spaced apart slot openings, and second sidewall upper surface has three large spaced apart slot openings and four small spaced apart slot openings, an upper surface of corner the first corner has an arcuate slot opening, and each respective upper surface of the second, third and fourth corners each respectively have a small arcuate opening;
    b.4. the integrally molded backplate has an exterior surface of the integrally molded back plate, the exterior surface adjacent to second rear sidewall has three spaced apart slot openings and the exterior surface adjacent to first rear corner has an arcuate slot opening and the exterior surface adjacent to first rear sidewall has two spaced apart slot openings,
    b.5 the interior soft shell has a first sidewall and a second sidewall, a top wall and a bottom wall, which extend between the front surface and the rear surface of the interior soft shell, the front hard shell and rear hard shell are respectively retained onto the front surface and the rear surface of the soft interior shell without extending to the first top wall, the second top wall, the first sidewall and the second sidewall between the front hard shell and the rear hard shell;
  c. the front hard exterior shell which has a continuous boundary including an upper transverse section, a first sidewall, a lower transverse section and a second sidewall, the upper transverse section and the lower transverse section are parallel and the first sidewall and second sidewall are parallel, the upper transverse section and the first sidewall flow together at a first corner, the upper transverse section and the second sidewall flow together at a second corner, the lower transverse section and the first sidewall flow together at a third corner, the lower transverse section and second sidewall flow together at a fourth corner, the upper transverse section, the first sidewall, the lower transverse section, the second sidewall, and the first corner, the second corner, the third corner and the fourth corner all have the same width which is wider than width and surrounding corners of the front of the soft interior shell, the front hard exterior shell has an interior opening, the front exterior hard shell has a continuous exterior circumference with mating fasteners such as clip extending from the exterior circumference of each section and aligned with the slot openings on the front surfaces of the interior soft silicone shell, an exterior edge of upper transverse section has mating fasteners respectively aligned with and received in slot openings of the upper section of the front surface of the soft exterior shell an exterior edge of lower transverse section has a mating fastener aligned with and received in the slot opening of the lower transverse section of the front surface of the soft interior shell, the exterior edge of the first corner has an arcuate mating fastener and the exterior edge of the first sidewall has mating fasteners respectively aligned with and received in the arcuate slot opening, and the slot openings in the first sidewall of the soft interior shell and exterior edge of the second sidewall has fasteners respectively aligned with and received in slot openings in the second sidewall of the soft interior shell, the front hard exterior shell is retained within the front surface of the soft interior shell without extending to any top, bottom or sidewall between the first hard shell and the second hard shell, the front hard exterior shell width extends over a portion of the front surface of molded back plate to help retain a cell phone within the soft interior shell;

d. a back hard shell has a continuous boundary including an upper transverse section, a first sidewall, a lower transverse section and a second sidewall, the upper transverse section and lower transverse section are parallel and the first sidewall and second sidewall are parallel, the upper transverse section and first sidewall flow together at a first corner, the upper transverse section and the second sidewall flow together at a second corner, the lower transverse section and the first sidewall flow together at a third corner, the lower transverse section and the second sidewall flow together at a fourth corner, an arcuate fastener extends from the interior surface adjacent corner and spaced apart fasteners extend from rear surface adjacent first sidewall of the hard plastic shell and are respectively aligned with and retained in the arcuate slot opening in the rear of first sidewall and slot openings in the rear of first sidewall, and spaced apart fasteners extend from the interior surface adjacent second sidewall and are respectively aligned with and received in slot openings in the second sidewall of the soft flexible shell, so that the rear hard shell is retained onto the rear surface of integrally molded backing plate without extending to top, bottom and two sidewall of the soft interior shell.

2. A cell phone protector case, comprising:

a. an interior soft shell made out of material selected from the group consisting of silicone and soft rubber, a front hard exterior shell made out of material selected from the group consisting of hard plastic and metal and a rear hard exterior shell made out of material selected from the group consisting of hard plastic and material, the front hard exterior shell is open so that a user has access to the front keypad, front operating buttons and screen or touch screen, the interior soft shell is designed to conform the shape of the a specific model of cell phone retained in the soft interior shell by a press fit and partially retained by the exterior shell;

b. the interior soft shell includes the following:

b.1 a continuous boundary for a front surface having an upper transverse section a first transverse sidewall, a lower transverse section and a second transverse sidewall, the upper transverse section and the lower transverse section are parallel and the first sidewall and the second sidewall are parallel, the upper transverse section and the first sidewall flow together at a first corner, the upper transverse section and the second sidewall flow together at a second corner, the lower transverse section and the first sidewall flow together at a third corner, the lower transverse section and the second sidewall flow together at a fourth corner, the upper transverse section, the first sidewall, the lower transverse section and second sidewall all have the same first width, b.2 an integrally molded back plate having a front interior surface and a rear exterior surface which respectively match each interior surfaces of the respective upper section, first corner, first transverse sidewall, third corner, lower section, the fourth corner the second transverse sidewall, and second corner completes a framework of the interior soft shell, b.3 the respective front surfaces of the upper transverse section, first sidewall, lower transverse section and second sidewall each have at least one slot opening as follows: the upper section front surface has two spaced apart slot openings, lower transverse section front surface has one slot opening; first corner upper surface has an arcuate slot opening and first sidewall upper surface has two large spaced apart slot openings, and four small spaced apart slot openings, and second sidewall upper surface has three large spaced apart slot openings and four small spaced apart slot openings, an upper surface of the first corner has an arcuate slot opening, and respective upper surfaces of the second, third and fourth corners each respectively have small arcuate slot openings;

b.4. the integrally molded backplate has an exterior surface, the exterior surface adjacent to second sidewall has three spaced apart slot openings and the exterior surface adjacent to first corner has an arcuate slot opening and first sidewall has two spaced apart slot openings, b.5 the interior soft shell a first end wall and a second end wall, a top wall a bottom wall, a first sidewall and second side wall which extend between the front surface and the rear surface of the interior soft shell, the front hard shell and rear hard shell are respectively retained onto front surface and rear surface of the soft interior shell without extending to the first end wall, the second end wall, the first side wall and the second sidewall between the front hard shell and the rear hard shell;

c. the front hard exterior shell which has a continuous boundary including an upper transverse section, a first sidewall, a lower transverse section and a second sidewall, the upper transverse section and the lower transverse section are parallel and the first sidewall and second sidewall are parallel, the upper transverse section and the first sidewall flow together at a first corner, the upper transverse section and the second sidewall flow together at a second corner, the lower transverse section and the first sidewall flow together at a third corner, the lower transverse section and second sidewall flow together at a fourth corner, the upper transverse section, the first sidewall, the lower transverse section, the second sidewall, and the first corner, the second corner, the third corner and the fourth corner all have the same width which is wider than width and surrounding corners of the front of the front of the soft interior shell, the front hard exterior shell has an interior opening, the front exterior hard shell has a continuous exterior circumference with mating fasteners such as clip extending from an exterior circumference of each section and aligned with the slot openings on the front surfaces of the interior soft silicone shell, an exterior edge of upper transverse section has mating fasteners respectively aligned with and received in slot openings of the upper section of the front surface of the soft exterior shell and the exterior edge of lower transverse section has a mating fastener aligned with and received in the slot opening of the lower transverse section of the front surface of the soft interior shell, the exterior edge of the first corner has an arcuate mating fastener and the exterior edge of the first sidewall has mating fasteners respectively aligned with and received in the arcuate slot opening, and the slot openings in the first sidewall of the soft interior shell and exterior edge of the second sidewall has fasteners respectively aligned with and received in slot openings in the second sidewall of the soft interior shell, the front hard surface respectively has small arcuate fasteners at its second, third and forth corners which are respectively retained in the small arcuate slot openings in the second, third and fourth corners of the soft interior shell, the front hard exterior shell is retained within the front surface of the soft interior shell without extending to any top, bottom or sidewall of the interior soft shell between upper and lower surfaces of the soft interior shell, and therefore also between the first hard shell and the second hard shell, the front hard exterior shell width extends over a portion of the front surface of molded back plate to help retain a cell phone within the soft interior shell;

d. a back hard shell has a continuous boundary including an upper transverse section, a first sidewall, a lower transverse section and a second sidewall, the upper transverse section and lower transverse section are parallel and the first sidewall and second sidewall are parallel, the upper transverse section and first sidewall flow together at a first corner, the upper transverse section and the second sidewall flow together at a second corner, the lower transverse section and the first sidewall flow together at a third corner, the lower transverse section and the second sidewall flow together at a fourth corner, an arcuate fastener extends from the interior surface adjacent corner and spaced apart fasteners extend from rear surface adjacent first sidewall of the hard plastic shell and are respectively aligned with and retained in the arcuate slot opening in the rear of first sidewall and slot openings in the rear of first sidewall, and spaced apart fasteners extend from the interior surface adjacent second sidewall and are respectively aligned with and received in slot openings in the second sidewall of the soft flexible shell, so that the rear hard shell is retained onto the rear surface of integrally molded backing plate without extending to top, bottom and two sidewalls of the soft interior shell.

3. A cell phone protector case used in conjunction with a cell phone, the cell phone protector case, comprising:

a. an interior soft shell, a front hard exterior shell, and a rear hard exterior shell, the cell phone retained within an open chamber surrounded by a top wall, a bottom wall, opposite sidewalls and an integrally molded backing plate of the interior soft shell, the front hard exterior shell is open so that a user has access to at least a keypad and screen of the cell phone;

b. the interior soft shell includes a front exterior continuous boundary forming the circumference of a front surface and having a continuous upper surface extending adjacent to and conforming to respective interior edges of the front exterior continuous boundary, the interior soft shell also including a rear exterior continuous boundary forming the circumference of as rear surface, a circumferential wall formed between the front exterior continuous boundary and the rear exterior continuous boundary;

c. an integrally molded back plate having a front interior surface and a rear exterior surface, the rear exterior surface aligned with a circumferential interior edge of the rear exterior continuous boundary, the front interior surface of the integrally molded back plate and an interior edge of the circumferential wall and the continuous upper surface forming an interior chamber with the soft interior member, the interior chamber conforming to a shape of a specific model cell phone which is retained within the chamber so that at least the cell phone screen is visible;

d. the continuous upper surface of the interior soft shell having a multiplicity of slot openings extending through the upper surface and into a body of the upper surface adjacent to the circumferential wall, a rear surface of the backing plate having a multiplicity of slot openings adjacent the rear exterior continuous boundary; and c. the front hard shell and rear hard shell have mating fastening members respectively received into a respective aligned and corresponding slot of the interior soft shell so that the front hard shell and rear hard shell are respectively retained onto the upper surface of the front of the soft interior shell and the rear surface of the backing plate without requiring the fastening members to come in contact with the circumferential wall.

4. The cell phone protector case in accordance with claim 3, further comprising:

a. the multiplicity of slots in the soft interior shell are at least located at spaced apart locations on the front upper surface; and b. the mating fasteners of the front hard shell are located adjacent a circumference of the first hard shell an are respectively aligned with a respective one of the slots in the front upper surface of the soft interior shell.

5. The cell phone protector case in accordance with claim 3, further comprising:

a. at least one of the multiplicity of slots in the soft interior shell are located at least at one corner on the front upper surface; and b. at least one of the mating fasteners of the front hard shell is located adjacent a corner and aligned with the at least one slot in the corner of the first interior shell.

6. The cell phone protector case in accordance with claim 3, further comprising:

a. the soft interior shell is made of silicone;

b. the front hard shell is made of hard plastic; and c. the rear hard shell is made of hard plastic.

7. The cell phone protector case comprising:

a. a soft silicone interior member having a central chamber in which a cell phone is retained, the soft silicone interior having an exterior boundary with an adjacent front surface aligned with and extending along the perimeter of the exterior boundary, the soft silicone interior having a rear circumferential boundary defining a rear surface, with a circumferential wall extending between the front surface formed by the front circumferential boundary and the rear surface formed by the rear circumferential boundary;

b. a backing plate formed and integral with the soft silicone member, a front surface of the integrally formed backing plate forming the rear wall of the interior chamber retaining the cell phone protector case in conjunction with respective bodies under the front surface which rest adjacent the exterior front boundary;

c. a multiplicity of retaining slots formed into the front surface of the spaced apart locations on the front surface;

d. a multiplicity of retaining slots formed into the rear surface of the backing plate;

e. a first hard shell protector having a circumferential rim with a multiplicity of fastening members formed onto an interior surface of the hard plastic shell, a respective one of the multiplicity of fastening members aligned with a respective one of the multiplicity of slots in the front surface of the soft silicone member, the front hard shell retained onto the front surface of the soft silicone shell for insertion of a respective fastening member into a respective retaining slot;

f. a rear hard plastic shell having a multiplicity of fastening members on an interior surface of a rear hard plastic shell, a respective one of the multiplicity of the fastening members on the rear hard plastic shell inserted into and retained by a retaining slot in the backing surface; and g. the multiplicity of retaining fasteners which retain the front hard plastic shell to the front surface of the soft interior member and the multiplicity of retaining fasteners which retain the rear hard protector shell to the rear surface of the soft silicone member to not extend into or over the circumferential sidewall between the upper surface and the lower surface of the protector case.

\* \* \* \* \*